United States Patent
Anhut et al.

(10) Patent No.: US 12,298,487 B2
(45) Date of Patent: May 13, 2025

(54) APPARATUS AND METHOD FOR CAPTURING IMAGE DATA

(71) Applicant: CARL ZEISS MICROSCOPY GMBH, Jena (DE)

(72) Inventors: Tiemo Anhut, Jena (DE); Daniel Schwedt, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 740 days.

(21) Appl. No.: 17/453,069

(22) Filed: Nov. 1, 2021

(65) Prior Publication Data
US 2022/0137383 A1 May 5, 2022

(30) Foreign Application Priority Data
Nov. 1, 2020 (DE) ...................... 10 2020 213 713.7

(51) Int. Cl.
G02B 21/00 (2006.01)

(52) U.S. Cl.
CPC ..... *G02B 21/0032* (2013.01); *G02B 21/0052* (2013.01); *G02B 21/008* (2013.01)

(58) Field of Classification Search
None
See application file for complete search history.

(56) References Cited

U.S. PATENT DOCUMENTS

| | | | |
|---|---|---|---|
| 12,001,006 B2 * | 6/2024 | Anhut | ................... H04N 25/78 |
| 2015/0362713 A1 | 12/2015 | Betzig et al. | |
| 2018/0203217 A1 | 7/2018 | Knebel et al. | |
| 2019/0113731 A1 | 4/2019 | Betzig et al. | |
| 2022/0043246 A1 * | 2/2022 | Anhut | ................ G02B 21/0076 |

FOREIGN PATENT DOCUMENTS

| | | |
|---|---|---|
| CN | 110346340 A | 10/2019 |
| CN | 110584593 A | 12/2019 |
| EP | 3721279 A1 | 10/2020 |
| EP | 3811851 A1 | 4/2021 |

OTHER PUBLICATIONS

Broxton, et al., "Wave optics theory and 3-D deconvolution for the light field microscope", Optics Express, vol. 21, No. 21 (https://graphics.stanford.edu/papers/lfdeconvolution/broxton_oe-21-21-25418.pdf), 2013, pp. 25418-25439.

(Continued)

*Primary Examiner* — Derek S. Chapel
(74) *Attorney, Agent, or Firm* — Brake Hughes Bellermann LLP

(57) ABSTRACT

An apparatus includes a detection beam path, along which detection radiation is guided, and a means for splitting the detection radiation between first and second detection paths, with a detector being in each detection path. A microlens array is arranged upstream of at least one detector. The first detector has a first spatial resolution, and the second detector has a second spatial resolution that is lower than the first spatial resolution. Also, the first detector has a first temporal resolution, and the second detector has a second temporal resolution that is higher than the first temporal resolution. Captured image data and computationally combined to form a three-dimensionally resolved resulting image.

18 Claims, 7 Drawing Sheets

(56) References Cited

OTHER PUBLICATIONS

Scrofani, et al., "FIMic: design for ultimate 3D-integral microscopy of in-vivo biological samples", Biomedical Optics Express, vol. 9, No. 1, Jan. 2018, pp. 335-346.

Wang, et al., "Deep learning enables cross-modality super-resolution in fluorescence microscopy", Nature Methods. vol. 16(1); (https://www.ncbi.nlm.nih.gov/pmc/articles/PMC7276094/), Jan. 2019, pp. 103-110.

Weisenburger, et al., "A Guide to Emerging Technologies for Large-Scale and Whole-Brain Optical Imaging of Neuronal Activity", Annual Reviews Neuroscience, vol. 41 (https://doi.org/10.1146/annurev-neuro-072116-031458), Apr. 25, 2018, pp. 431-452.

Zhang, et al., "A Comparable Study of CNN-Based Single Image Super-Resolution for Space-Based Imaging Sensors", Sensors, (https://www.mdpi.com/1424-8220/19/14/3234), 19(14), 3234, 2019, 18 pages.

European Search Report for Application No. 21204994.4, mailed on Mar. 14, 2022, 11 pages.

Cong, et al., "Rapid whole brain imaging of neural activity in freely behaving larval zebrafish (*Danio rerio*)", eLife, Neuroscience, Tools and Resources (https://elifesciences.org/articles/28158), Sep. 20, 2017, 20 pages.

\* cited by examiner

APPARATUS AND METHOD FOR CAPTURING IMAGE DATA

CROSS REFERENCE TO RELATED APPLICATION

This application claims priority, under 35 U.S.C. Section 119, to German Application No. 10 2020 213 713.7, filed Nov. 1, 2020, the disclosure of which is incorporated herein by reference in its entirety.

TECHNICAL FIELD

This disclosure relates to apparatuses and to methods for capturing image data.

SUMMARY

Modern microscopy is focusing more and more on the rapid capture of three-dimensional sample volumes. One major application here is the measurement of neural signals in networks of nerve cells. These networks spread across hundreds or thousands of micrometers in the brain. In order then to be able to understand essential capabilities of the brain, reactions of these networks or of large portions thereof are intended to be captured as completely as possible with high temporal resolution.

Since this concerns not just the understanding of the morphological structure, but rather functional processes, these methods are also brought together under the keyword of functional imaging.

A number of different methods that can be used to approximate functional imaging are known in the field of microscopy. Methodical approaches such as a rapid 2D recording, for example, which is then scanned axially, are generally too slow for the field of application outlined above. Methods oriented purely toward an algorithmic evaluation (computational imaging) are generally susceptible to artifacts.

Confocal scanning methods with a low degree of parallelization have the disadvantage that they operate relatively slowly and time-sequentially. An increase in speed is often accompanied by an increase in the light power in the sample, wherein a higher light power can saturate fluorescent markers used and damage the sample. A further point-scanning method is multi-photon microscopy. In that case, too, the degree of parallelization is low.

A higher parallelization is possible by means of spinning disk microscopy, for example. In that case, a greater number of sampling beams are guided simultaneously over a sample, and the detection radiation brought about in each case is captured through so-called pinholes present in a rotating disk. This confocal method allows, for example, a few hundred focal volumes to be scanned in parallel.

Methods and arrangements which make use of so-called light sheet illumination likewise have a higher degree of parallelization. To that end, a static or dynamic light sheet is generated and directed into the sample. On account of the very small thickness of the light sheet transversely with respect to the two-dimensional extent thereof (light sheet thickness), detection radiation, in particular, fluorescent radiation, is brought about only in a plane currently being illuminated.

Alternatively to selective illumination of regions of the sample, widefield illumination is used when light field microscopy is applied. Detection in accordance with light field technology permits fast capturing of data within, in terms of microscopy, larger volumes and good depth resolution. The disadvantages can be seen in the lack of a possibility of optical sectioning and strong background radiation.

The capture of a larger volume with simultaneously improved resolution can be achieved by the use of a microlens array upstream of the detector. To that end, the publication Cong et al. (Cong, L. et al. 2017; eLife, 6:e28158), proposes a microlens array with microlenses of different focal lengths arranged therein. What is disadvantageous, however, is that only a part of the aperture is used by each of the microlens groups.

The invention is based on the object of proposing a possibility that enables three-dimensional regions of a sample to be imaged with a high temporal resolution and simultaneously a high spatial resolution.

The object is achieved by an apparatus for capturing image data. The apparatus includes a detection beam path, along which detection radiation of at least one microscope is guided or is guidable. The apparatus can receive detection radiation of the microscope, for example, at an intermediate image or at another suitable interface. Furthermore, a means for splitting the detection radiation between a first detection path and a second detection path is present in the detection beam path. A first detector is arranged in the first detection path and a second detector is arranged in the second detection path, wherein a microlens array is arranged upstream of at least one of the detectors, in particular in the relevant first detection path or second detection path. The at least one microlens array is arranged in a pupil plane or in an image plane. Here, the first detector has a first spatial resolution (image resolution), and the second detector has a second spatial resolution. The first spatial resolution is higher than the second spatial resolution. In addition, or alternatively, the first detector has a first temporal resolution (detection rate), and the second detector has a second temporal resolution, wherein the first temporal resolution is lower than the second temporal resolution.

The apparatus is characterized in that an evaluation unit, for example, a computer, is present for evaluating the captured image data of the first and second detectors. The evaluation unit is configured such that the evaluations of the image data of both detectors are computationally combined to form a three-dimensionally resolved resulting image.

An image, in particular, a three-dimensionally resolved resulting image, is understood to mean, in particular, a data set that represents a (digital) three-dimensional representation of the sample. The data set can be visualized, for example, as a two- or three-dimensional graphic.

Thus, image data of different spatial and/or temporal resolutions are provided, and the data can be combined to form resulting images having both a high temporal resolution and also high spatial resolution. Here, information relating to the location, advantageously also respective angle information of the captured light beams, are captured and evaluated per detection element (pixel) of the detectors. With an appropriate combination of two detectors and the computational combination of the captured image data, it is possible to achieve both very good three-dimensional resolution, which meets, for example, the requirements with respect to the spatial resolution for use in neurobiology, and also to make possible a volume detection rate of e.g., 100 full volumes per second and beyond.

The first and second detectors of the apparatus are, for example, two-dimensional detectors having a number of detector elements arranged in the form of a grid. Since a very high sensitivity (low noise) is required, EMCCD or sCMOS sensors, for example, are suitable as detectors. SPAD detectors, for example, SPAD arrays such as CMOS-SPAD array sensors, for example, will also gain in importance in the future.

The technical differences of the first and second detectors are advantageously chosen such that the respective spatial resolutions and temporal resolutions differ from one another to such an extent that, while both recording modes sufficiently differ from one another, they can be combined with one another with a suitable amount of outlay. This serves to actually gain the respective advantages of the modes and, by an appropriate combination thereof, to obtain and be able to utilize the image qualities within the meaning of the invention.

For the subsequent statements, it is assumed that the first detector has a higher spatial but lower temporal resolution than the second detector, unless something else is explicitly described. For example, the first spatial resolution can be higher than the second spatial resolution at least by a factor of 1.5, and the first temporal resolution can be lower than the second temporal resolution at least by a factor of 2.

In order to support a computational combination of the image data captured by the respective detectors, the first detector (also referred to as "slowcam" below) and the second detector (also: "fastcam") are aligned with respect to one another in such a way that an assignment of the image data, for example, of individual images or frames, to one another is possible. Slowcam and fastcam are advantageously calibrated with respect to one another such that the respectively captured image data can be overlaid on one another and/or be computationally combined.

The purpose of a combination of the captured image data is also served if the first and second detectors are synchronized with one another with regard to their respective capture intervals.

The splitting of the detection radiation between the first and respectively the second detection path can be effected in various ways. The means for splitting the detection radiation can be, for example, a beam splitter, in particular a neutral splitter, a dichroic beam splitter, or a switchable mirror.

It is advantageous if the detection radiation is steered into the detection paths in a splitting ratio that permits optimized operation of both detectors. For example, the first detector with the higher spatial resolution (slowcam; longer recording duration) can receive proportionally less light than the second detector with the lower spatial but the higher temporal resolution. For example, the neutral splitter can effect a corresponding splitting ratio. It is also possible for the detection radiation to be split spectrally, and for a part of the spectrum to be steered into the first detection path and for another part of the spectrum to be steered into the second detection path. If a pivotable mirror is used for the splitting, the detection radiation can temporarily be fully steered into the first or into the second detection path. It is advantageous here if the switching of the mirror is controlled temporally such that the slowcam is illuminated with detection radiation according to its frame rate.

The detection radiation can be transferred at an intermediate image plane as interface between microscope and apparatus. The detection radiation is converted from an intermediate image plane into an optical pupil by means of a Fourier transform.

The requirements to be satisfied, for example, for the examination of processes in the brain of small organisms, such as a fruit fly, for example, shall be elucidated on the basis of an example. In this case, an observation of approximately 10,000 neurons is required. The optical resolution should be at least of the magnitude of the perikaryon of the neurons at approximately 5 µm. If the volume of the brain is converted to a cube, then a volume of 400×400×400 µm should be able to be observed. Methods suitable for satisfying these requirements are known inter alia as the plenoptic principle, light field microscopy, or integral imaging, and are employed in microscopy.

The literature discloses various methods for imaging three-dimensional volumes using a two-dimensional sensor.

In this regard, a distinction is drawn between two variants in principle, which have in common the fact that a microlens array (MLA) is mounted upstream of a detector. In light field microscopy that has frequently been used hitherto, the MLA is often positioned in the nominal image plane. The pixels downstream of the respective microlens then capture the respective angle information of the light emitted by the sample (object) (e.g., Broxton et al. 2013; OPTICS EXPRESS 21: 25418-39).

An advantageous arrangement for microscopy is afforded, however, if the pupil plane of the arrangement is optically divided. For this purpose, a microlens array is arranged in such a way that the detector is situated in a plane that is conjugated with respect to the sample plane. In this case, the microlenses of the microlens array are implemented in a plane that is optically conjugated with respect to the objective pupil. The embodiment, described in more detail below, is based on this variant.

The microlens arrays of the apparatus need not be identical. Different microlens arrays can be selected, for example, in order to achieve a good adaptation to the geometry of a detector, or to the chip thereof, or in order to optimally balance the spatial resolution in relation to the detection rate, etc.

Currently available detectors allow a parallelized recording with a large number of pixels into the range of a few megapixels. In the following general descriptions, detectors from PCO AG (Kehlheim, Germany) are emphasized merely by way of example.

For example, the camera pco.edge 26 MP allows the recording of 5120×5120 pixels, wherein each pixel (detector element) has a size of 2.5 µm×2.5 µm. This results in a sensitive area of the detector of 12.8 mm×12.8 mm. The sensor diagonal thus has a length of 18.1 mm. According to the data sheet (as of July 2020), the image recording rate of the camera is 7.1 frames per second (fps) (slowcam), wherein the pixel data rate is given as 267 Mpixels/s.

Furthermore, for example, the detector pco.edge 4.2 is available, whose sensitive area has a diagonal of 18.8 mm and in this respect is comparable to the pco.edge 26MP. However, the detector pco.edge 4.2 can be read even significantly faster and thus allows frame rates (fps) of up to 100 frames per second (fastcam). The detector has 2048×2048 pixels with a pixel size of 6.5×6.5 µm each. The sensitive area is 13.3×13.3 mm in size.

Consequently, both detectors mentioned are equivalent to one another as regards their external dimensions. What is decisive is that the detector pco.edge 4.2 can be operated at frame rates of up to 100 fps. Therefore, the time difference between two successive volume recordings is only approximately 10 ms.

Depending on the sample geometry, in one configuration it is possible to further increase the recording speed by reading only a selected part of the pixels. The selection can be effected in advance, randomly or dynamically. For example, if only 2048×1024 pixels of the fastcam are read, rates of up to 200 volumes per second are possible. In the case of a further reduction of the number of pixels read of 2048×512 pixels, for example, even rates as high as 400 volumes per second are achieved. The time difference between two full volumes captured is then just 2.5 ms, which makes it possible to capture the reaction of neural networks in their entirety both spatially and temporally. In this regard, for example, the average firing rate of a neuron of the fruit fly is specified as about 40 Hz and the size of a neuron is specified as about 2 to 5 µm (Weisenburger, S. & Vaziri, A., 2018; Annual Review of Neuroscience 41: 431-452).

In further configurations the speed of image capturing can be increased by performing interpolations between pixels and by using the interpolated values for a subsequent computation. In this procedure, fewer pixels need to be read.

If the apparatus forms a constituent part of a microscope, the latter, in one possible embodiment, can be embodied with a scanned light sheet for illuminating the sample. This type of illumination is advantageous for various reasons. For example, light from sample planes that are not of interest is discriminated very well, the axial resolution can be increased, and at the same time a low energy input into the sample and thus little photodamage are attained. Using the second detector in the second detection path, it is possible to measure at, for example, ten positions of the light sheet and thus to image ten volumes per second at a frame rate of the fastcam of 100 Hz.

The following considerations can be undertaken in order, for example, to select the detectors used in an apparatus according to the invention.

For the lateral resolution in Fourier light field microscopy, the following holds true (Scrofani, G. et al., 2018; BIO-MEDICAL OPTICS EXPRESS 9: 335-346).

$$\delta x \leq \max\left\{\frac{\lambda N}{2 NA_{MO}}; 2ps \frac{f_{TL} f_{MO}}{f_{MLA} f_{pup}}\right\}. \quad (1)$$

In this case, $\lambda$ is the wavelength of the light, $NA_{MO}$ is the numerical aperture of the microscope objective, ps is the pixel size, and f are focal lengths of the tube lens (TL), of the microscope objective (MO), of the microlens array (MLA), and of the lens for pupil transformation (pup).

The first expression describes the wave-optical resolution under the assumption that the point spread function at the detector is sampled in accordance with the Nyquist criterion. The second expression is limiting if sampling is no longer effected according to the Nyquist criterion. The resolution is then limited by the size of the pixels imaged into the sample.

Since a better resolution is not obtained if the requirements of the Nyquist criterion are significantly exceeded, there is no need to effect sampling with more pixels than necessary. The ratios of the focal lengths, numbers of pixels, and microlenses are therefore advantageously chosen such that both expressions above are approximately equal.

The size of the imaged intermediate image (ZBE), which functions, for example, as a transfer location of the microscope, results in accordance with equation (2):

$$ZBE = \#pxps \frac{f_{pup}}{f_{MLA}}. \quad (2)$$

For the above-described arrangement, it is now necessary to consider the case in which the ratios in the two detection paths differ. As already stated, the faster detector (fastcam) has fewer but larger pixels than the slower detector (slowcam).

For example, if in the case of double the pixel size ps the number of pixels #px is halved in equation (2), the intermediate image and thus also the field of vision remain the same size if the focal length $f_{MLA}$ of the microlens array MLA and the focal length $f_{pup}$ of the pupil lens are kept the same. However, if the resolution according to equation (1) is set such that both expressions are the same size, the resolution in the case of larger pixels ps is dominated by the second expression. Since in this case the Nyquist criterion is no longer satisfied, the resolution obtained with the larger pixels ps is worse. The resolution would approximately halve.

In order to achieve equal imaging qualities in the two detection paths, the apparatus can, in a further embodiment, be configured such that approximately the same signal-to-noise ratio (SNR) is set in the two detection paths. In the simplified example of the abovementioned detectors, the apparatus could be set up in a manner such that the slowcam at 7 fps has an exposure time of approximately 143 ms, while the fastcam in each case integrates 10 ms. In order to set a similar signal-to-noise ratio for both detectors, the detection radiation to be measured is split in the same ratio between both sensors such that, in this example, the fastcam receives 143 parts of the detection radiation, while the slowcam measures only 10 parts. In addition, the distribution ratio can be modified by taking into account, for example, the lateral sampling, that is to say the number of pixels used for capturing the PSF (point spread function).

Slight deviations from the splitting ratio are possible without a loss of quality because the SNR is scaled only with the square root of the pixel time if the signal intensity is otherwise the same. The arrangement can furthermore also be designed to be flexible so as to set every desired ratio.

In addition to the above-described distribution of the signals of the detection radiation, it is also possible that it is not signals of one wavelength but rather signals of two different wavelengths that are distributed over the respective detectors. This procedure is then advantageous, in particular, if fast processes, such as, for example, calcium transients, are measured. For example, the calcium indicator GCaMP emits in the green spectral range. Its fluorescence signals can be captured with the second detector with the high second temporal resolution, while the structures of the sample that do not change or change only slowly are captured with the detector having the lower temporal resolution. For example, the structural information can originate from a membrane dye emitting in the red spectral range.

The illumination can therefore be in the form of single-color or multicolor linear or non-linear illumination. For example, widefield illumination can be carried out incoherently or with a laser, wherein the illumination is advantageously temporally variable such that speckles that occur over a measurement interval of the fastcam are sufficiently averaged and thus reduced or even eliminated.

Illumination, for example, with a light sheet, can be effected by means of an objective that serves as an illumination objective and as a detection objective. This embodiment allows a compact design. In a further embodiment, the illumination can, for example, be radiated in laterally and thus be independent of the detection objective. Moreover, it can be advantageous if means for setting temporally pulsed illumination in the sense of a stroboscopic illumination in the milliseconds range are present in order to stimulate a temporal variation of the fluorescence signals.

In a further embodiment, an MLA can be arranged in a pupil plane or in a nominal image plane upstream of one of the detectors, while a further detector is a two-dimensional detector (2D detector), known from the prior art, without an MLA that is arranged upstream thereof. The further detector can be present in addition to the first detector and/or the second detector. In this case, the resulting image is generated from the image data of a detector with an upstream MLA and the image data of the 2D detector.

In a further embodiment, it is also possible that the first detector has a higher spatial resolution than the second detector. What is known as a pinhole in the form of a pinhole stop or slit stop is present in the first detection path in an intermediate image plane and upstream of the first detector. Due to the effect of the pinhole, out-of-focus portions of the detection radiation are stopped down, with the result that confocal capturing of the detection radiation is effected by means of the first detector. A microlens array is arranged upstream of the second detector. Advantageously, a scanning apparatus, by means of which an illumination light spot can be guided over a sample to be imaged, is situated in the illumination beam path. A current alignment of the scanning apparatus permits a unique assignment of a position of the illumination light spot, for example, in a plane (X-Y-plane) extending orthogonally to the optical axis of an illumination objective. A current position of the focus position of a detection objective (Z-position) is likewise captured. In such an embodiment, the light source of a laser scanning microscope (LSM) can be used for the provision of the illumination radiation. It is thus one possible embodiment if an LSM is combined with a light field microscope (LFM), for example, both are situated on a common stand, and the image data that have a different spatial and/or temporal resolution and are captured by way of different modes of functioning of the microscopes are computationally combined to form a three-dimensional resulting image. The illumination radiation of the LSM can be used for both microscopes (LSM and LFM). If necessary, switching alternately back and forth between the detection paths is effected. Optionally, a detection radiation can also be split proportionally between the detection paths. Both the capture of the associated location of captured image data and a piece of information of an associated Z-position of the relevant image data allow the generation of a three-dimensional image data set by means of the first detector of such an embodiment of the apparatus. As an alternative to a scanning apparatus, a relative movement between the illumination light spot and the sample can be effected by means of a controlled adjustment of an e.g. motorized sample stage.

The apparatus can, in particular, be connected to a microscope or be a component of a microscope. A microscope comprising an apparatus as disclosed herein can be used in diverse ways and allows, in particular, a sample volume to be imaged three-dimensionally with both a high spatial resolution and a high temporal resolution. By way of example, a microscope comprising an apparatus and having a first mode of functioning can be connected to another microscope having a second mode of functioning. In this regard, for example, a light field microscope can be technically connected to a laser scanning microscope as mentioned such that, for example, the light source of the laser scanning microscope is used for both modes of functioning.

The microscope can have, in an illumination beam path, a light source, an objective functioning as an illumination objective, and an apparatus for generating a light sheet, wherein the light sheet is generated or can be generated in a sample space on the object side upstream of the objective.

In a further possible embodiment, the light source can be embodied for providing pulsed illumination light. In this regard, pulses having pulse durations in the picoseconds or femtoseconds range can be generated and provided. Illumination of this type can be used for non-linear fluorescence excitation. Furthermore, capturing the fluorescence lifetimes is thus possible using a corresponding sensor. By way of example, a pulsed laser is used as light source. One of the detectors can be a SPAD array (single photon avalanche diode array).

The apparatus for generating a light sheet in a light sheet plane can be, for example, a cylindrical optical unit, a scanning apparatus, or a combination of both. Both embodiments can be designed to generate a light sheet that is oblique relative to the optical axis of the illumination objective in a correspondingly obliquely extending light sheet plane. To that end, an illumination light beam of the light source that is shaped due to the effect of the cylindrical lens or an illumination light beam of the light source that is focused by means of the scanning apparatus can be directed into an entrance location in an objective pupil (also referred to as entrance pupil below) of the objective, said entrance location lying outside of the optical axis of the objective. Such an embodiment makes it possible to use a common objective for the illumination and the detection. In alternative embodiments, an illumination objective and a detection objective can be arranged.

In order to adjust a thickness of the generated light sheet transversely with respect to the light sheet plane, settable optical means, for example, a zoom optical unit and/or a stopping-down apparatus, can be present in the illumination beam path. In this case, the thickness can be set manually or automatically, for example, by a measurement task that is to be carried out being chosen and the thickness of the light sheet being adapted accordingly. Additionally, or alternatively, a control loop can influence the thickness of the light sheet if, for example, specified quality parameters of the captured image data are not achieved. Such quality parameters are for example a predetermined SNR or a signal-to-background ratio (SBR).

An object is additionally achieved by a method for capturing image date, in which detection radiation, in particular, at least of a microscope, is split between a first detection path and a second detection path.

In the first detection path, the detection radiation is captured by means of a first detector with a first temporal resolution (first detection rate) and a first spatial resolution. In the second detection path, the detection radiation is captured by means of a second detector with a second temporal resolution (second detection rate) and a second spatial resolution, wherein the first temporal resolution is lower than the second temporal resolution and/or the first spatial resolution is higher than the second spatial resolution.

The captured image data of both detectors are computationally combined with one another in order to obtain a three-dimensionally resolved resulting image. In this case, it is possible, for example, to computationally combine image data captured in the first and second detection paths for each detector to form a three-dimensionally resolved image and subsequently to combine the three-dimensionally resolved images to form a resulting image, or the captured image data of both detectors are computationally combined to form a three-dimensionally resolved resulting image.

In a further configuration of the method, image data of the higher spatial resolution or image data of the higher temporal resolution are used for computationally increasing the spatial resolution and/or the temporal resolution of the image data with the lower spatial resolution or the lower temporal resolution, respectively.

Advantages of this configuration of the method, in particular, lie in the fact that the data with the higher spatial resolution that are measured at a lower detection rate are used to be able to also virtually present the images with a high detection rate but lower spatial data capturing (sampling), that is to say with a lower spatial resolution, with at least the same or a better resolution.

For example, if the same spatial resolution is achieved as in the image with the higher spatial resolution, this corresponds to multiple comparisons with the structures of the sample that are actually present (also referred to as field comparison or "ground truth") during an image capturing sequence.

To name one example, it can be assumed that the fastcam operates at 100 Hz and therefore captures image data having a lower spatial resolution than the slowcam, which operates at 1 Hz and provides image data having a high spatial resolution. For example, a comparison of the "ground truth" can be effected every 100 images (frames).

In further configurations of the method, the computational combination of the captured image data and/or the combination of the image data or of the images to form a resulting image can be performed with the application of machine learning, in particular, with the application of convolutional neural networks.

As already stated, an essential finding lies in the use of image data in a manner such that the information of both detection paths are advantageously combined in order to attain both fast image recording and also a very high image quality, that is to say in particular a high spatial resolution. A first possibility is initially the combined presentation of the image data. For this purpose, the images or image stacks having a higher spatial resolution are presented in a suitable manner with the image data having a higher temporal resolution. For example, the image data of the slowcam and fastcam are computationally combined as image-to-image mapping in a manner such that, owing to the high-resolution images recorded at the respective temporal supporting points, which, however, were recorded more slowly due to the greater number of pixels of the detector (slowcam), even the images that were recorded with a high temporal resolution at a lower spatial resolution have an image quality that would correspond to a higher spatial resolution.

A further possibility are the aforementioned convolutional neural networks (CNN). In the case where the network has many layers, this is also referred to as deep CNNs. These algorithms are used, for example, in order to achieve a virtual increase in the resolution for traditionally recorded images. For this purpose, the network is trained with high-resolution data of the type of the corresponding object. Afterward, the trained CNN can compute a virtual high resolution even from data whose resolution is not as good (e.g. Wang, H. et al., 2018; Nature Methods 16: 103-110). A comparison of various algorithms is found in Zhang, H. et al., 2019; Sensors 19: 3234.

The algorithms provided for use are trained in such a way that they can be used for improving the resolution of the recorded image data. If brain tissue is intended to be imaged, for example, the network is trained with sufficiently many image data of brain tissues. As a result, it is possible to bring about an improvement of the image quality in both detection paths of the specified apparatus.

It is advantageous that different microscope objectives can be used without the arrangement of the apparatus having to be changed. This is accomplished particularly if the pupil size is approximately identical. It is advantageously possible to use objectives that have an identical M/NA ratio (e.g. 40x/1.2 NA; 20x/0.6 NA, 10x/0.3 NA). It is thus possible to observe volumes of different sizes with, in each case, a somewhat different resolution.

The computational combination of the image data of recordings can be performed with different magnification ratios. To that end, a smaller volume captured with a higher resolution is embedded in a large volume captured with a somewhat lower resolution.

For the provision of the illumination, it is possible to use a laser scanning microscope (LSM), for example, in the form of an additional module. High-resolution image data captured by way of an LSM mode can be combined, for example, with lower-resolution image data of a 3D measurement. For this purpose, the LSM can be set in an optionally selectable operating mode in such a way that light sheet generation is made possible. This can be achieved, for example, by the laser beam being focused into the entrance pupil of the micro-objective.

Accordingly, a combination of the capture according to light field technology with structured illumination microscopy (SIM) is also possible.

In further configurations, the captured and/or computationally combined image data can be combined with measurement data of an LSM or of other imaging microscopy methods (e.g. phase contrast; differential interference contrast; structured illumination microscopy, etc.).

If machine learning is used, this can bring about an improvement in the image resolution on the basis of a correspondingly trained CNN. The CNN can be continually adapted and improved using an image-to-image correspondence between the two detection paths.

Further improvements in the image quality can be achieved by incorporating, for example, data of a three-dimensionally recorded image stack into the CNN training process or in some other manner of image fusion. The data can be obtained and provided, for example, by means of a laser scanning microscope operated simultaneously. The invention additionally allows optical manipulations in 2D and 3D (e.g., holographically). Moreover, it is possible to carry out an evaluation of the measurements in the sense of dSTORM, PALM etc.

Advantages reside in a good to very good spatial resolution and a very good temporal resolution as a result of high parallelization of the voxel capture. A strong suppression of the background and/or a high axial resolution can be achieved in the case of illumination with a light sheet. It is furthermore advantageous that the techniques described herein can be implemented on an existing microscope and, in this case, the numerical aperture of the microscope objective is fully usable. After computationally combining the image data, an axial resolution can be achieved that is only slightly diminished in comparison with the depth of field of the objective with a full numerical aperture. The techniques described herein are suitable for use on living samples, for example, on account of its low loading for the sample and rapid three-dimensional imaging.

By means of the techniques described herein, three-dimensional regions of a sample can be simultaneously captured with a temporal resolution in the range of a few milliseconds with at the same time a sufficient spatial resolution of approximately 2-3 µm. Moreover, disturbing background signals are effectively suppressed, such that a high sensitivity is achieved during the imaging of the observed regions of the sample. In the 3D sample, the intention is thus ultimately for as many voxels as possible to be recorded simultaneously with the highest possible temporal resolution. The method proposed here allows this and offers very highly parallelized imaging of three-dimensional volumes.

The techniques described herein allow, in particular, observations of objects of an order of magnitude of approximately 0.005 mm to approximately 3 mm (e.g., down to a size of dendrites). The temporal resolution is approximately 0.01 to 1 second, but in specific cases can also be 0.001 to 100 seconds.

The solution proposed here allows imaging with a high optical resolution and in addition a very high volume imaging rate.

BRIEF DESCRIPTION OF THE DRAWINGS

The invention will be described in more detail below on the basis of exemplary embodiments and figures. In the figures.

DETAILED DESCRIPTION

Figure 1:
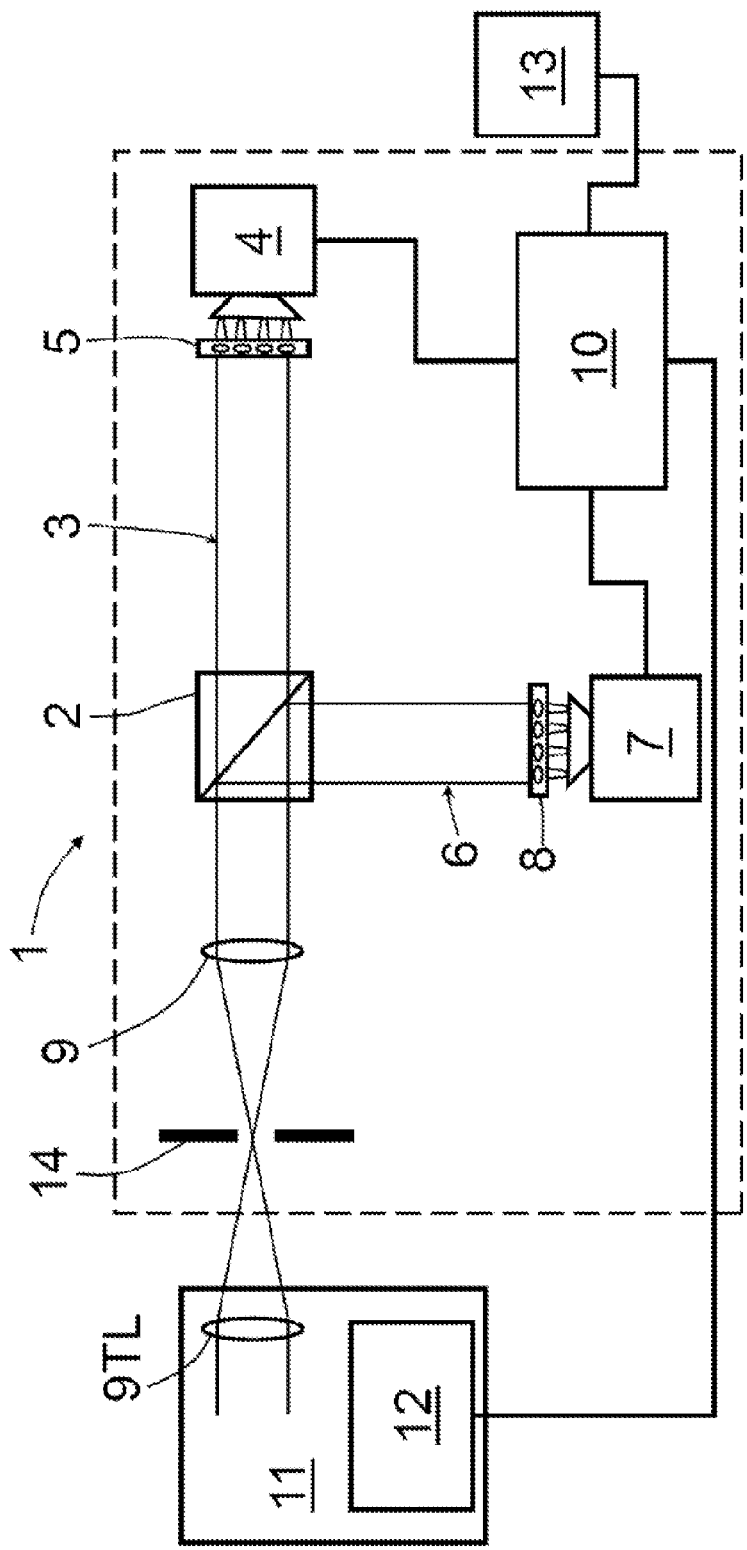
FIG. 1 shows a schematic illustration of a first exemplary embodiment of an apparatus.

A general setup of an apparatus 1 has along a beam path a means 2 for splitting detection radiation in the form of a beam splitter (beam splitter 2), the effect of which is to split detection radiation between a first detection path 3, having a first detector 4 and, arranged upstream thereof, a first microlens array 5, and a second detection path 6, having a second detector 7 and, arranged upstream thereof, a second microlens array 8. The microlens arrays 5 and 8 are each arranged in a pupil. If optical lenses 9 are specified in the exemplary embodiments, they optionally also stand for corresponding combinations of optical elements (lens systems).

The first detector 4 allows a first spatial resolution that is higher than the spatial resolution of the second detector 7. A temporal resolution of the first detector 4 (slowcam) is lower than the temporal resolution of the second detector 7 (fastcam). In further embodiments, the first and second detectors 4 and 7 can also be arranged in the respectively other detection path 3 or 6.

Detection radiation that comes from a microscope 11 and is focused due to the effect of a tube lens 9TL passes through an optional field stop 14 in an intermediate image plane, passes to an optical lens 9, and is split due to the effect of the beam splitter 2 between the first detection path 3 and the second detection path 6. The imaging of the pupil plane of the microscope 11, in particular of a pupil plane (back focal plane) of the microscope objective 18 (see e.g. FIG. 4), into the planes of the microlens array 8 is effected via the lens system 9TL, 9. The lens 9TL functions as a tube lens, while the downstream lens 9 acts as a Fourier lens, i.e. brings about a Fourier transform of the detection radiation.

The image data captured by the detectors 4, 7 are fed to an evaluation unit 10 in the form of a computer or an FPGA. The latter is configured such that the evaluation of the captured image data takes place by taking into account the location information, angle information, and intensity values, and, for example, either the captured portions of the angle information per detector 4, 7 as image data are computationally combined to form in each case a three-dimensionally resolved image and subsequently combined to form a resulting image, or the captured portions of the angle information of both detectors 4, 7 as image data are combined to form a three-dimensionally resolved resulting image.

The evaluation unit 10 is optionally connected to a display 13, for example, a monitor, on which the image data and/or the resulting image or a resulting image stack are representable. Moreover, the evaluation unit 10 is optionally connected to a control unit 12, which can be in particular a constituent part of the microscope 11. In further possible embodiments, the control unit 12 is not an integral part of the microscope 11, but can be connected to the latter in a manner suitable for transmitting data (see e.g., schematically in FIG. 2).

The control unit 12 is configured for generating control signals on the basis of results of the evaluation unit 10. Said control signals can serve for controlling functions of the microscope 11.

Figure 2:
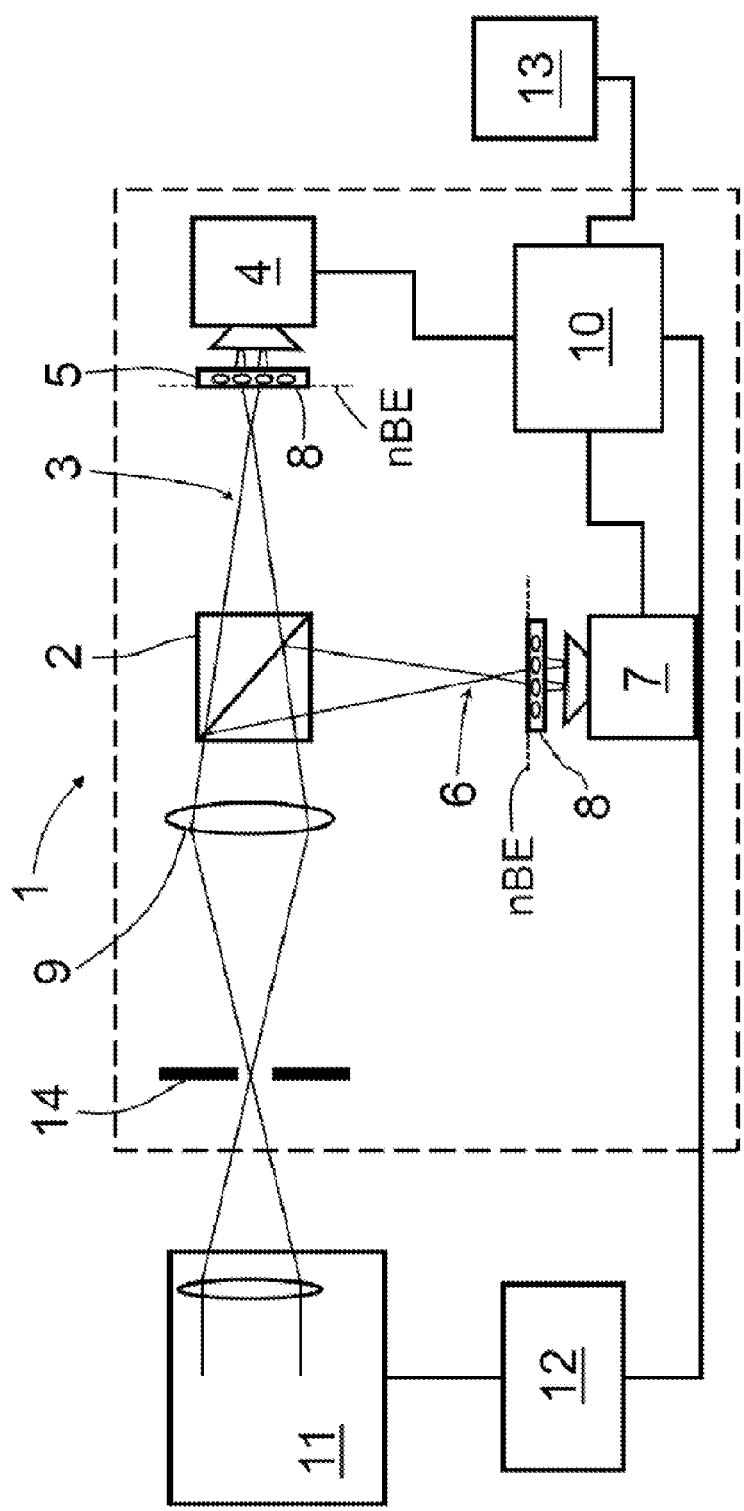
FIG. 2 shows a schematic illustration of a second exemplary embodiment of an apparatus.

In a further exemplary embodiment of the apparatus 1, the microlens arrays 5, 8 are arranged in each case in a nominal image plane nBE (FIG. 2). From there, the captured detection radiation is directed onto the respective detector 4 or 7 due to the effect of the microlenses. The nominal image plane nBE thus represents an intermediate image plane. An optical lens 9 functioning as a focusing lens is arranged upstream of the beam splitter 2. Depending on whether a (point) light source (not shown), the light of which is intended to be captured, is located in an object plane (focal plane) of the objective 18 (see, for example, FIG. 4), the point light source in turn is imaged (in an idealized fashion) in the shape of a point onto the MLA 5, 8. If the point light source is situated above or below the object plane in the detection direction, the point light source is imaged not exactly into the nominal image plane nBE but behind or in front of it (see, by way of example, FIG. 2). The spatial position of the point light source can be computed, for example, by means of the correspondingly configured evaluation unit 10 on the basis of the intensity values that have been captured by means of the individual pixels and additionally represent location information, and on the basis of the captured angle information.

Figure 3:
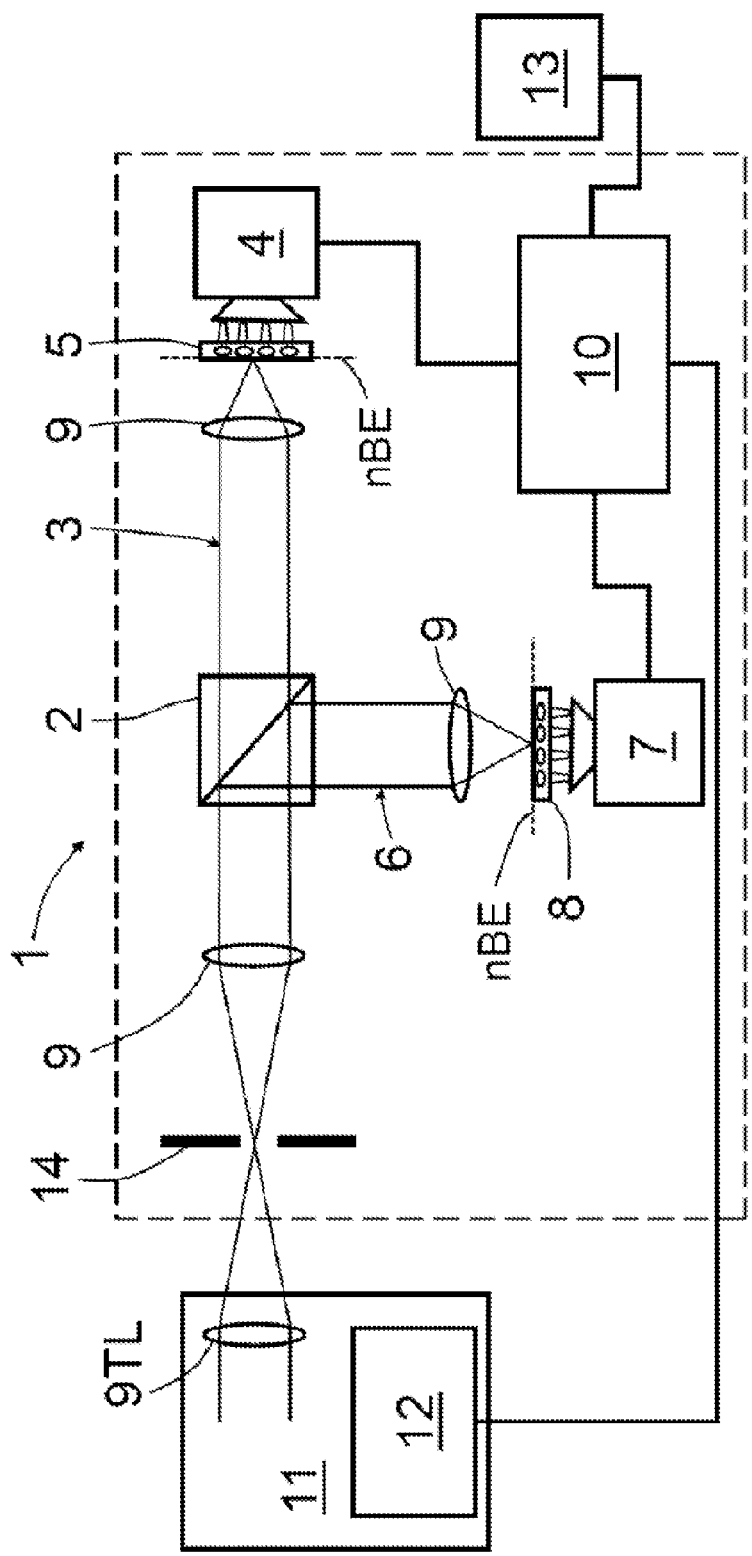
FIG. 3 shows a schematic illustration of a third exemplary embodiment of an apparatus.

The third exemplary embodiment of the apparatus 1 likewise has the microlens arrays 5 and 8 in each case in a nominal image plane nBE (FIG. 3). The detection radiation is focused into the nominal image plane nBE due to the effect of optical lenses 9 arranged in the respective detection paths 3 and 6.

The exemplary embodiments illustrated in FIGS. 1 to 3 can be used, for example, for two-channel light field microscopy. Spectral components of the detection radiation can be separated by means of the beam splitter 2.

In an exemplary embodiment of the apparatus 1 in a microscope 11 (FIG. 4), a light source 15 for providing laser light as excitation light, optical lenses 9, a light-directing device 17 or scanning apparatus 17, a color splitter 16, and an objective 18 with an entrance pupil EP, said objective functioning as an illumination objective, are present in an excitation beam path. The light source 15, in particular in the form of a laser light source, can optionally be operated in a pulsed manner.

An optical lens 9 and the beam splitter 2, by means of which detection radiation is directed along the first detection path 3 with the first microlens array 5 and the first detector 4 and/or along the second detection path 6 with the second microlens array 8 and the second detector 7, are arranged in a detection beam path (symbolized by interrupted solid lines). The detectors 4 and 7 are connected to the evaluation unit 10 and the latter is connected to the control unit 12 in a manner suitable for exchanging data. By means of the control unit 12, it is possible to generate control commands that serve for controlling the scanning apparatus 17 (henceforth also: scanner 17). In further embodiments, the light source 15 can also be controlled by the control unit 12.

During the operation of the microscope 11 comprising the apparatus 1, laser light emitted by the laser light source 15 is focused and passes to the scanning apparatus 17. The scanning apparatus 17, which is controlled by the control unit 12, deflects the laser light in a controlled manner in an x-direction x and/or in a y-direction y. The scanning apparatus 17 can be used to vary the angle of incidence and an entrance location of the excitation light in the entrance pupil EP (objective pupil).

The excitation light, after passing through the dichroic color splitter 16, is directed into an entrance location in the entrance pupil EP that lies away from the optical axis oA of the objective 18. As a result, a light sheet 19 which is inclined with respect to the optical axis oA in a correspondingly inclined light sheet plane is generated on the object side by way of the objective 18. If a sample is located in a sample space 20 upstream of the objective 18, the light sheet 19 can be directed into said sample.

Optionally settable optical means 21, such as a zoom optical unit or a stop, for example, the effect of which is that a thickness of the light sheet 19 transversely with respect to the light sheet plane is settable (only shown by indication), can be present in the excitation beam path e.g., the illumination beam path). The settable optical means 21 can be controlled by means of the control unit 12.

Due to the effect of the light sheet 19 formed from the excitation light, fluorescence can be excited in the sample and be emitted as detection light (detection radiation). Emitted detection light is collected by the objective 18, which serves both as the illumination objective and as the detection objective. In the color splitter 16, the detection light, which has a longer wavelength than the excitation light, is reflected into the further course of the detection beam path and passes via the beam splitter 2 to the first microlens array 5 and/or the second microlens array 8. The microlenses, shown by indication, can be regarded as individual imaging systems. The image points brought about by the individual microlenses are captured as image data by correspondingly positioned detector elements of the detectors 4 and 7, respectively, and are fed to the evaluation unit 10.

Figure 4:
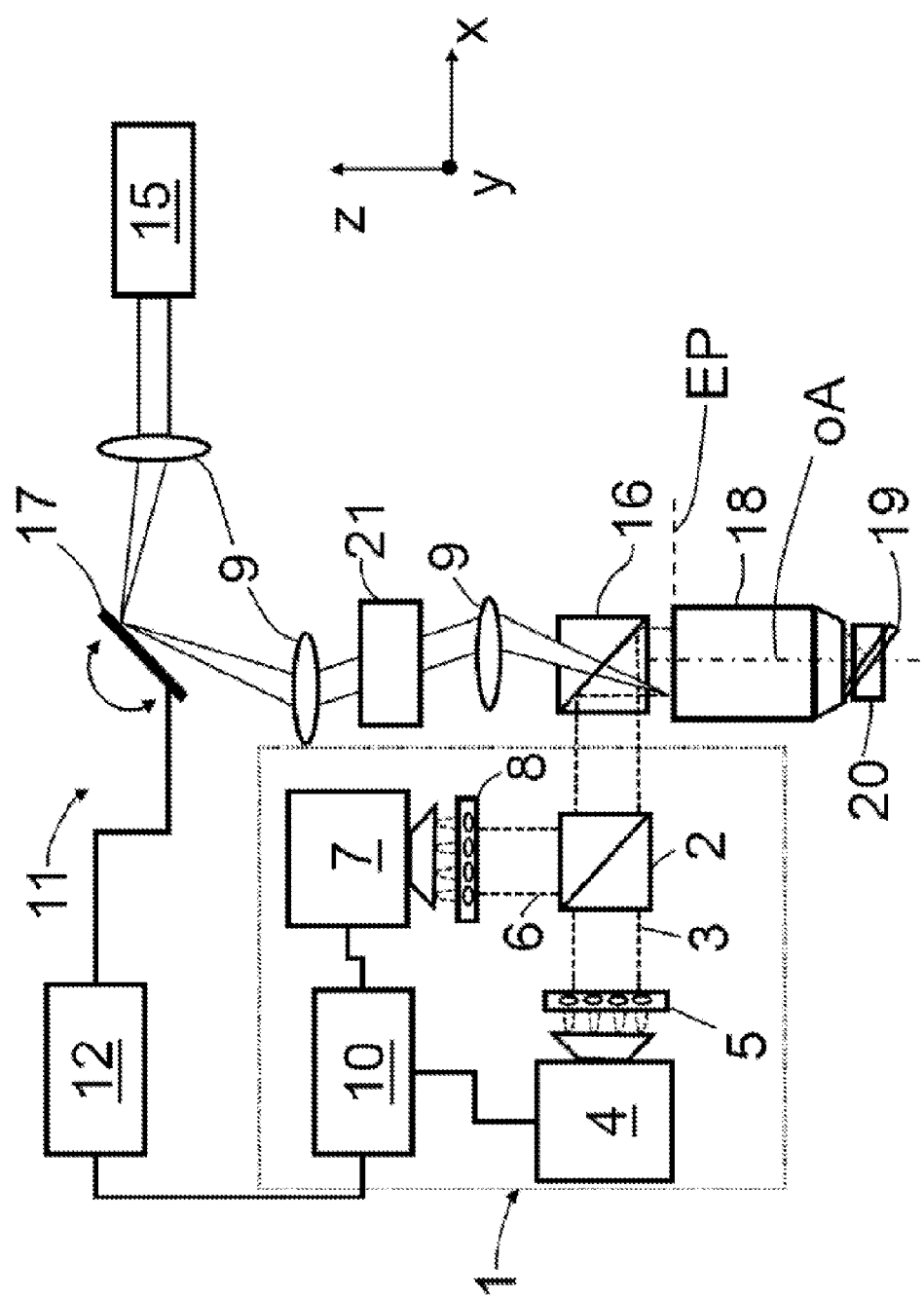
FIG. 4 shows a schematic illustration of a first exemplary embodiment of a microscope with an apparatus and with means for generating a light sheet.
Figure 5:
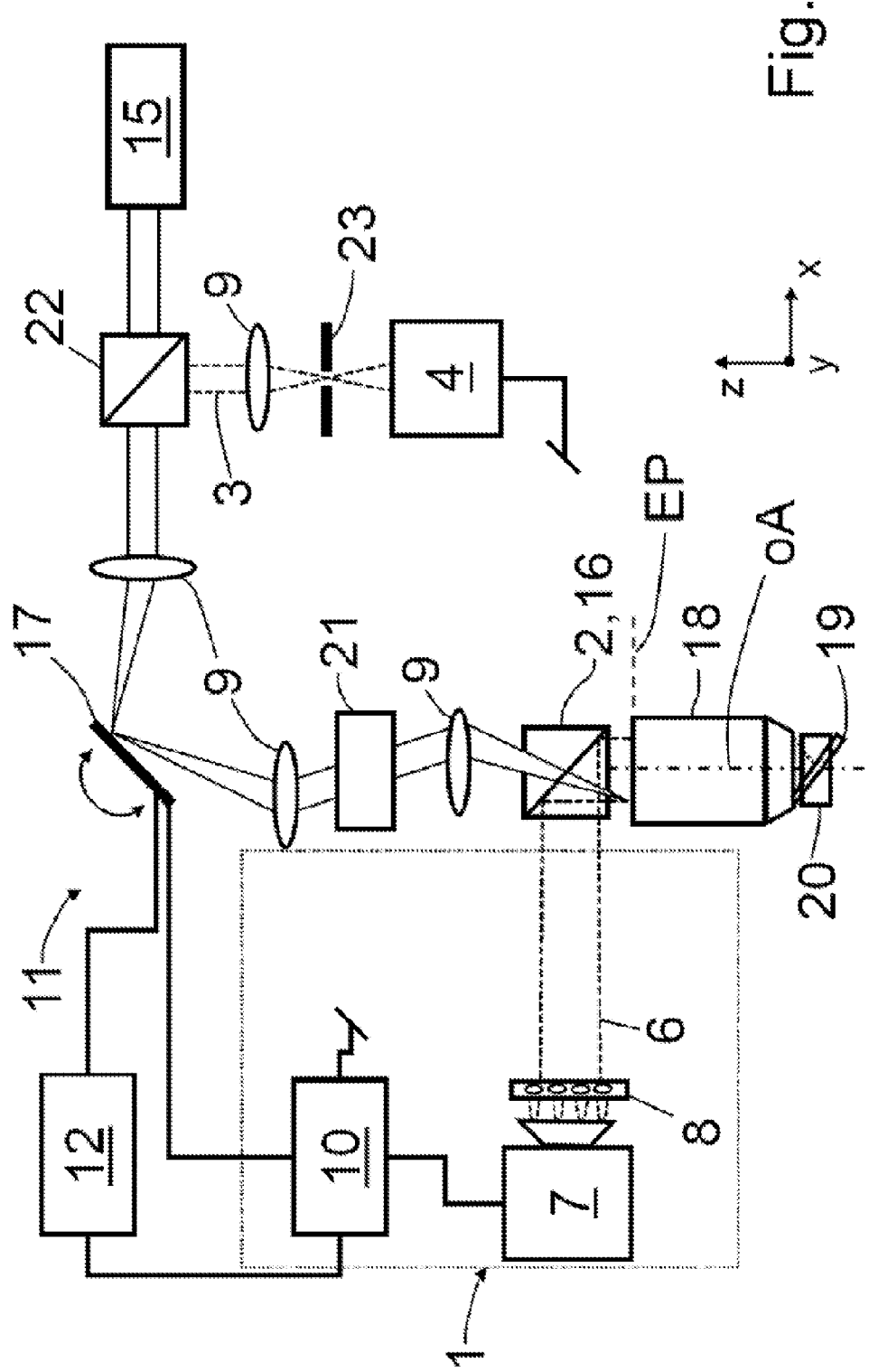
FIG. 5 shows a schematic illustration of a second exemplary embodiment of a microscope with an apparatus and with means for generating a light sheet.

One further possible embodiment is illustrated in FIG. 5, based on FIG. 4. A further dichroic beam splitter 22 is arranged in the illumination beam path between the light source 15 and the scanning apparatus 17. Due to the effect of said beam splitter, detection radiation which, coming from the sample space 20, has passed through the beam splitter 16 and the subsequent optical elements and has been converted into a stationary beam (descanned) due to the effect of the scanning apparatus 17 is directed into the last section of the first detection path 3. In this exemplary embodiment, the beam splitter 16 (also) functions for splitting the captured detection radiation between the first and second detection paths 3, 6 (beam splitter 2) and can be dichroic or split detection radiation in a specific ratio. The detection radiation is focused by means of an optical lens 9 into an intermediate image plane, in which a pinhole 23 in the form of a pinhole stop or a slit stop is situated. Due to the effect of the pinhole 23, the portions that originate from out-of-focus regions are removed from the beam of the detection radiation or at least largely reduced. By way of example, a secondary electron multiplier (photomultiplier tube, PMT), an array of a plurality of PMTs, or a two-dimensional detector (see above) can be used as the first detector 4. The first detector 4 is connected to the evaluation unit 10. The latter is in turn connected to the scanning apparatus 17 in order to obtain data relating to a respectively current alignment of the scanning apparatus 17. On the basis of the current alignment, a position in an X-Y-plane can be assigned to the individual image data captured by means of the first detector 4. Information relating to the axial position (position in the z-direction, Z-position) can be ascertained on the basis of the known position of the current focal plane of the objective 18 and optionally taking account of a point spread function (PSF) that is known for the image capturing system. Image data can be captured at different z-positions (z-stack). In this way, three-dimensionally resolved image data can be captured with the first detector 4. Owing to the design of the first detection path 3 as a confocal detection path, a higher spatial resolution by comparison with the second detector 7 is achieved. If switching is effected alternately between capturing by means of the first detection path 3 (confocal) and the second detection path 6, the settable optical means 21 can accordingly be controlled to generate either an illumination light spot or a light sheet 19.

Due to the effect of the beam splitter 2, 16, the second detection path 6 receives detection radiation that is imaged onto the second detector 7 and captured. A microlens array 8 is arranged upstream of the second detector 7. In further embodiments, the beam splitter 2, 16 can be replaced by a switchable mirror, for example. The image data captured by means of the first detector 4 and the second detector 7 are combined by the evaluation unit 10 and a three-dimensional resulting image is computed.

Figure 6:
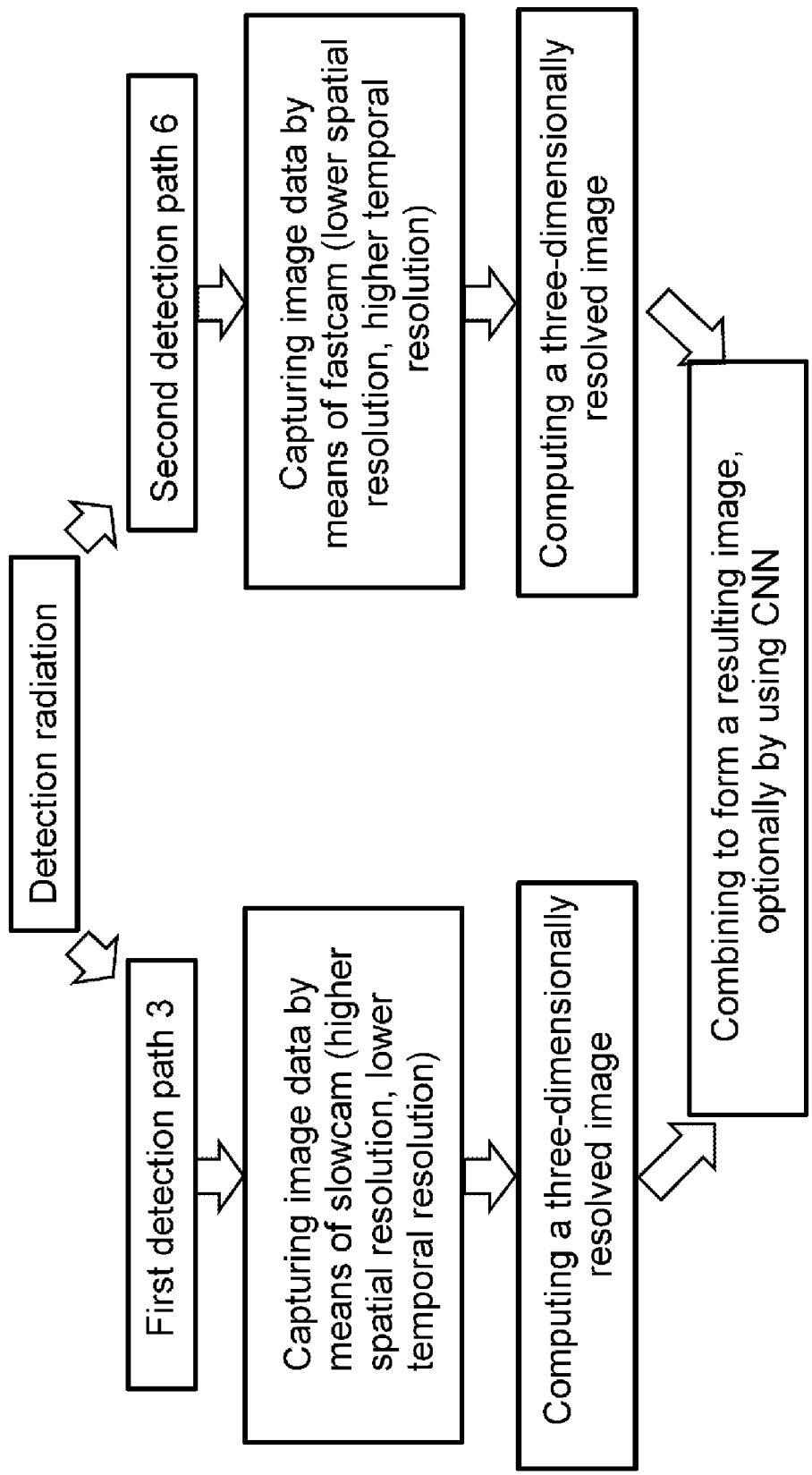
FIG. 6 shows a flowchart of a first configuration of the method.

The method can be carried out in two alternative configurations. In the first alternative (FIG. 6), the detection radiation is directed into the first and/or the second detection path 3, 6 and is captured there by means of the detector 4, 7 that is respectively present, for example, in accordance with the principle of light field technology. In each case, a three-dimensionally resolved image is computed both from the captured image data of the slowcam of the first detection path 3 and also from the image data of the fastcam of the second detection path 6. Subsequently, the three-dimensionally resolved images of the two detection paths 3, 6 are combined to form a resulting image.

Figure 7:
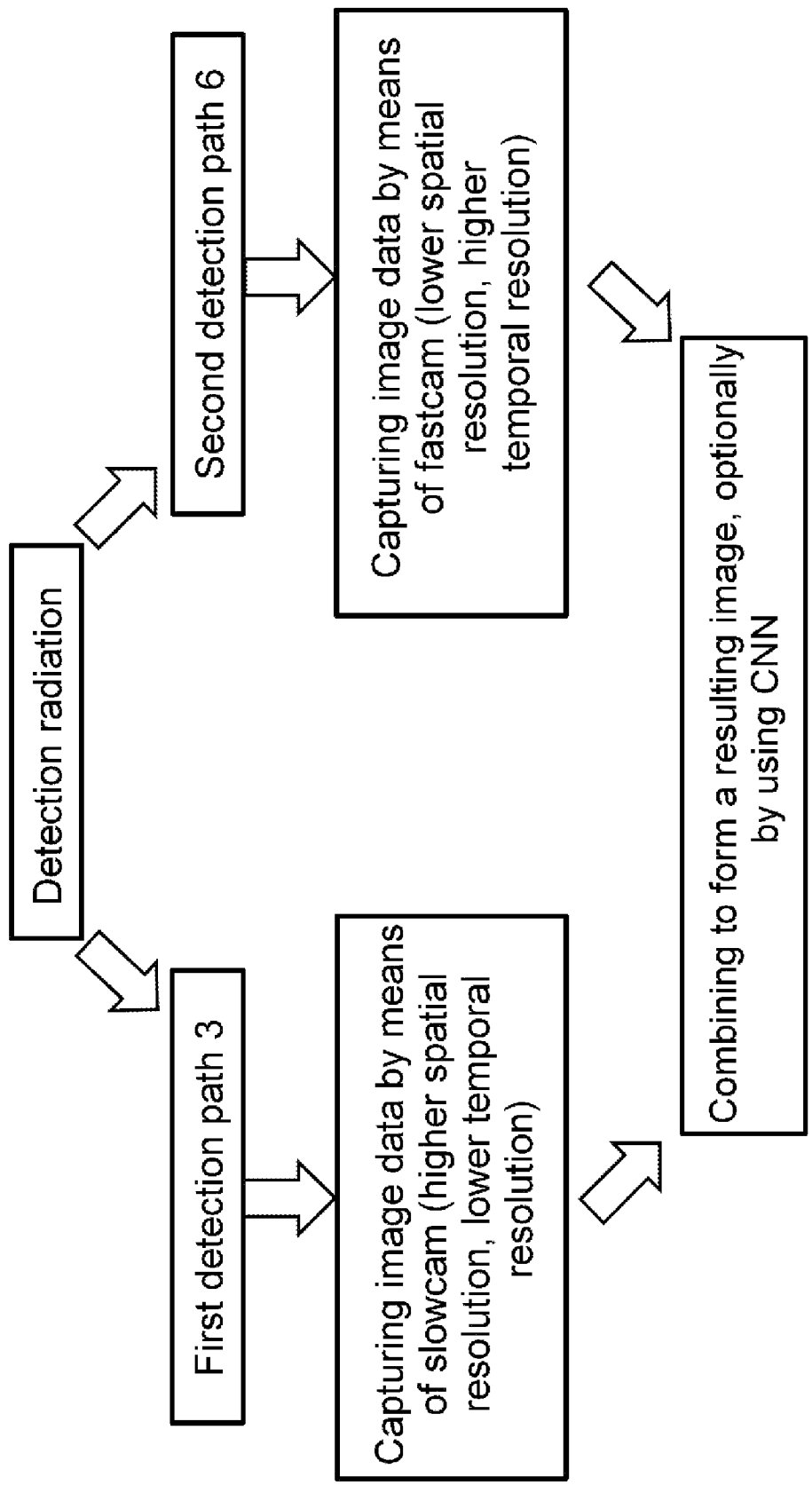
FIG. 7 shows a flowchart of a second configuration of the method.

In an alternative configuration of the method, the captured image data of the slowcam and of the fastcam are combined to form a resulting three-dimensionally resolved image without previously generating at least one three-dimensionally resolved image for each of the detection paths 3, 6 or for each of the detectors 4, 7 (FIG. 7).

In further configurations of the method, the image data captured by means of the first detector 4 and the second detector 7 or respectively images calculated therefrom can be mapped to one another using a CNN (convolutional neural network) and a three-dimensionally resolved resulting image can be calculated.

LIST OF REFERENCE SIGNS

1 Apparatus
2 Means for splitting the detection radiation/beam splitter
3 First detection path
4 First detector (slowcam)
First microlens array
6 Second detection path
7 Second detector (fastcam)
8 Second microlens array
9 Optical lens
10 Evaluation unit
11 Microscope
12 Control unit
13 Display
14 Field stop
16 Color splitter
15 Light source
17 Scanning apparatus
18 Objective
19 Light sheet
20 Sample space
21 Settable optical means
22 Beam splitter (for confocal beam path)
23 Pinhole
EP Entrance pupil
oA Optical axis

The invention claimed is:

1. An apparatus for capturing image data, the apparatus comprising:
a detection beam path, along which detection radiation of at least one microscope is guided or is guidable;
a means for splitting the detection radiation between a first detection path and a second detection path;
a first detector located in the first detection path, wherein the first detector is configured for capturing image data;
a second detector located in the second detection path, wherein the second detector is configured for capturing image data;
a microlens array located upstream, in a respective detection path, of at least one of the first detector and the second detector, wherein the first detector has a first spatial resolution and the second detector has a second spatial resolution, with the first spatial resolution being higher than the second spatial resolution, and/or wherein the first detector has a first temporal resolution and the second detector has a second temporal resolution, with the first temporal resolution being lower than the second temporal resolution; and
an evaluation unit configured for evaluating image data captured by the first detector and the second detector, wherein the evaluation unit is configured in a manner such that evaluation of the image data of the first detector and of evaluation of the image data of the second detector is performed and a three-dimensionally resolved resulting image is produced from the evaluated image data.

2. The apparatus of claim 1,
wherein the first detector has a higher spatial resolution than the second detector;
wherein the first detection path includes a pinhole located in the first detection path in an intermediate image plane and optically upstream of the first detector, such that confocal capturing of the detection radiation takes place by means of the first detector; and
wherein the microlens array is arranged in the second detection path upstream of the second detector.

3. The apparatus of claim 1,
wherein the first spatial resolution is higher than the second spatial resolution by at least a factor of 1.5, and
wherein the first temporal resolution is lower than the second temporal resolution by at least a factor of 2.

4. The apparatus of claim 1, wherein the means for splitting the detection radiation includes at least one of a beam splitter, a dichroic beam splitter, or a switchable mirror.

5. A microscope comprising:
a light source configured for providing light to a sample;
a detection beam path, along which detection radiation emitted from the sample is guided or is guidable;
a means for splitting the detection radiation between a first detection path and a second detection path;
a first detector located in the first detection path, wherein the first detector is configured for capturing image data;
a second detector located in the second detection path, wherein the second detector is configured for capturing image data;
a microlens array located upstream, in a respective detection path, of at least one of the first detector and the second detector, wherein the first detector has a first spatial resolution and the second detector has a second spatial resolution, with the first spatial resolution being higher than the second spatial resolution, and/or wherein the first detector has a first temporal resolution and the second detector has a second temporal resolution, with the first temporal resolution being lower than the second temporal resolution; and
an evaluation unit configured for evaluating image data captured by the first detector and the second detector, wherein the evaluation unit is configured in a manner such that evaluation of the image data of the first detector and of evaluation of the image data of the second detector is performed and a three-dimensionally resolved resulting image is produced from the evaluated image data.

6. The microscope of claim 5, wherein the light source includes a laser light source, and further comprising an illumination objective in an illumination beam path configured to provide widefield illumination of the sample.

7. The microscope of claim 6, wherein the light source is configured for providing the light as pulsed illumination light pulse durations shorter than a picosecond.

8. The microscope of claim 5, further comprising:
an illumination objective in an illumination beam path; and
an apparatus in the illumination beam path and configured for, in conjunction with the illumination objective, generating a light sheet from the light provided by the light source, wherein the light sheet is generated on an object side upstream of the illumination objective in a sample space.

9. The microscope of claim 8, wherein the light source is configured for providing the light as pulsed illumination light pulse durations shorter than a picosecond.

10. The microscope of claim 8, wherein the apparatus includes a cylindrical lens or a scanning apparatus, wherein an illumination light beam of the light source that is shaped due to the cylindrical lens or an illumination light beam of the light source that is deflected by means of the scanning apparatus is directed into an entrance location in an objective pupil (EP) of the illumination objective, said entrance location lying outside of an optical axis (oA) of the illumination objective.

11. The microscope of claim 8, further comprising a settable optical means in the illumination beam path for setting a thickness of the light sheet transversely with respect to a light sheet plane.

12. A method for capturing image data with a microscope, the method comprising:
splitting detection radiation between a first detection path and a second detection path, wherein a microlens array is present in at least one of the first detection path or the second detection path and wherein the microlens array is located optically upstream of a detector to which the detection radiation is directed;
capturing image data by means of a first detector located in the first detection path, the first detector having a first temporal resolution and a first spatial resolution;
capturing image data by means of a second detector located in the second detection path, the second detector having a second temporal resolution and a second spatial resolution, wherein the first temporal resolution is lower than the second temporal resolution and/or the first spatial resolution is higher than the second spatial resolution;
computationally combining the image data captured by means of the first detector and the second detector to form a three-dimensionally resolved resulting image.

13. The method of claim 12, further comprising:
computationally increasing a spatial resolution of the image data captured by means of the second detector based on the image data captured by means of the first detector.

14. The method of claim 12, further comprising:
computationally increasing a temporal resolution of the image data captured by means of the first detector based on the image data captured by means of the second detector.

15. The method of claim 12, wherein capturing image data by means of the second detector includes capturing the image data by a selected subset of detector elements of the second detector.

16. The method of claim 12, further comprising:
guiding the detection radiation alternately along the first detection path and the second detection path, wherein switching time points and time durations of the switching are based on a frame rate of the first detector.

17. The method of claim 12, wherein computationally combining the image data captured by means of the first detector and the second detector to form a resulting image is performed by application of a machine learning model.

18. The method of claim 17, wherein the machine learning model includes CNNs (convolutional neural networks).

* * * * *